US010311024B2

(12) United States Patent
Layzell et al.

(10) Patent No.: US 10,311,024 B2
(45) Date of Patent: Jun. 4, 2019

(54) MERGING FILE STORAGE DIRECTORY STRUCTURES THROUGH USER INTERFACE VISUALIZATION OF REFACTORING DECISIONS

(71) Applicant: CA, INC., New York, NY (US)

(72) Inventors: Robert Anthony Layzell, Novato, CA (US); Ganesh Prasad Agrawal, Sambalpur (IN); Todd David Anderson, Hopkinton, MA (US); Rahul Sharma, Noida (IN)

(73) Assignee: CA, INC., New York, NY (US)

( * ) Notice: Subject to any disclaimer, the term of this patent is extended or adjusted under 35 U.S.C. 154(b) by 283 days.

(21) Appl. No.: 15/253,000

(22) Filed: Aug. 31, 2016

(65) Prior Publication Data

US 2018/0060344 A1 Mar. 1, 2018

(51) Int. Cl.
| *G06F 15/177* | (2006.01) |
| *G06F 16/16* | (2019.01) |
| *G06F 3/0482* | (2013.01) |
| *G06F 3/0481* | (2013.01) |
| *G06F 3/0484* | (2013.01) |
| *G06F 16/178* | (2019.01) |

(52) U.S. Cl.
CPC .......... *G06F 16/168* (2019.01); *G06F 3/0482* (2013.01); *G06F 3/04812* (2013.01); *G06F 3/04847* (2013.01); *G06F 16/178* (2019.01)

(58) Field of Classification Search
CPC ......... G06F 17/30126; G06F 17/30174; G06F 3/0482; G06F 3/04842; G06F 3/04847
See application file for complete search history.

(56) References Cited

U.S. PATENT DOCUMENTS

| 6,088,693 | A  | * | 7/2000 | Van Huben | ......... G06F 17/3056 |
| 6,804,686 | B1 | * | 10/2004 | Stone | ........................ G06F 8/10 |
| 6,807,548 | B1 | * | 10/2004 | Kemper | .................. G06F 8/72 |
| 2010/0146396 | A1 | * | 6/2010 | Able | ................. G06F 17/30861 |
| | | | | | 715/735 |
| 2011/0153596 | A1 | * | 6/2011 | Parkar | .................. H04L 43/062 |
| | | | | | 707/723 |

* cited by examiner

*Primary Examiner* — Anil N Kumar
(74) *Attorney, Agent, or Firm* — Sage Patent Group

(57) ABSTRACT

Representations of hierarchical structures identified by source and target file storage directories are displayed on a display device. Inconsistencies are identified between the hierarchical structures identified by the source and target file storage directories. Graphical interconnections are displayed that extend at least partially between locations of at least some of the identified inconsistencies. Refactoring action indicia are displayed that are user selectable and are associated with defined actions performed by a file directory controller to modify the hierarchical structure identified by the target file storage directory to resolve at least some of the inconsistencies identified between the hierarchical structures identified by the source and target file storage directories. The source and target file storage directories are merged, including by performing the defined actions associated with user selected ones of the refactoring action indicia to generate a refactored target file storage directory that resolves the inconsistencies.

16 Claims, 12 Drawing Sheets

MERGING FILE STORAGE DIRECTORY STRUCTURES THROUGH USER INTERFACE VISUALIZATION OF REFACTORING DECISIONS

BACKGROUND

The present disclosure relates generally to a computer file system directory structures and, more particularly, to managing the merger of directory structures for files stored on file storage device.

Merging of different file storage directory structures can include reconciling files that may have been moved within a hierarchical folder structure, renamed, or deleted and where different versions of files may exist between the file storage directory structures. Merging can become necessary when a file or folder is copied from file storage device (e.g. source control repository) and modified by two people on two different computers. When two file storage directory structures are merged, the result is a single file storage directory structure that contains both sets of changes.

In some cases, the merge can be performed automatically only if the changes do not conflict. However, users resort to manual merging to reconcile changes between file storage directory structures that conflict. For instance, if two systems have differing versions of a configuration file a user may need to manually examine the files and select version to be included in the refactored file storage directory structure.

SUMMARY

Some embodiments disclosed herein are directed to a method of performing operations as follows on a processor of a file directory controller. The operations include accessing a source file storage directory and a target file storage directory where each identifies a hierarchical structure of folder names, subfolder names, and file names. The file names identify addressable locations on at least one file storage device where files are stored. The operations further include displaying representations of the hierarchical structures identified by the source file storage directory and the target file storage directory. Inconsistencies are identified between the hierarchical structures identified by the source file storage directory and the target file storage directory. Graphical interconnections are displayed that extend at least partially between locations of at least some of the inconsistencies identified in the displayed representations of the hierarchical structures identified by the source file storage directory and the target file storage directory. Refactoring action indicia are displayed that are user selectable and are associated with defined actions performed by the file directory controller to modify the hierarchical structure identified by the target file storage directory to resolve at least some of the inconsistencies identified between the hierarchical structures identified by the source file storage directory and the target file storage directory. The operations further include merging the source file storage directory and the target file storage directory including by performing the defined actions associated with user selected ones of the refactoring action indicia to generate a refactored target file storage directory that has the at least some of the inconsistencies resolved.

Some other embodiments disclosed herein are directed to a computer program product with a non-transitory computer readable storage medium. Computer readable program code is embodied in the medium and is executed by a processor of a file directory controller to cause the processor to perform the operations of the above method.

Other methods, computer program products, and file directory controllers according to embodiments will be or become apparent to one with skill in the art upon review of the following drawings and detailed description. It is intended that all such additional methods, computer program products, and control computers be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Figure 1:
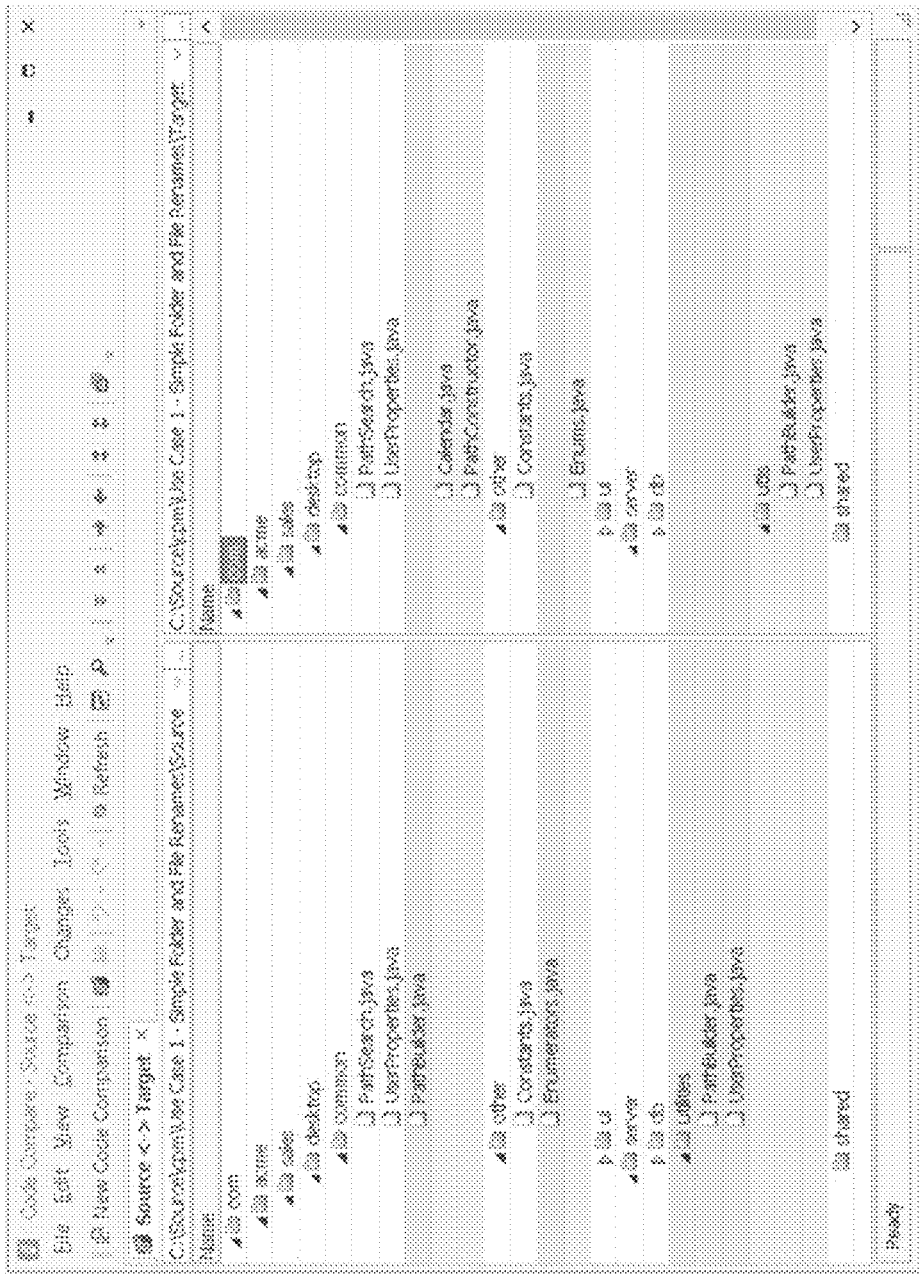
FIG. 1 illustrates a source file storage directory and a target file storage directory that are displayed in separate windows that may be manually compared by a user to determine inconsistencies in accordance with a prior art approach for merging source and target file storage directories.

Various embodiments will be described more fully hereinafter with reference to the accompanying drawings. Other embodiments may take many different forms and should not be construed as limited to the embodiments set forth herein. Like numbers refer to like elements throughout.

Embodiments of the present disclosure are directed to managing file storage directories, which control where digital information (e.g., program executable code, data processed by code, etc.) is stored as a file on (e.g., written to) and retrieved from (e.g., read from) one or more file storage devices. The structure and logic rules used to manage locations of the files and their names is provided by a file storage directory. A file storage device can include, but is not limited to, a hard disk drive, solid-state semiconductor memory (e.g., flash) device, magnetic tape device, and optical disc device.

A file storage directory can contain hierarchically structured folders, e.g., a root level folder containing nested hierarchies of subfolders therein, and each of the folders can contain files. The file storage directory may store metadata associated with each file, including the file name, length of the contents of the file, and the location of the file in a folder or within a hierarchical structure of folders. The time that the file was last modified may be stored as the file's timestamp. The metadata may further include a file version number, a file creation time, a time the file was last accessed, a time the file's metadata was changed, a file's device type (e.g. block, character, socket, subdirectory, etc.), a file owner user ID or group ID, a file's access permissions or other file attributes (e.g. whether the file is read-only, executable, etc.). The file name identifies addressable locations on the file storage device where the file is located and, correspondingly, can be retrieved, written, deleted, etc. In a hierarchically structured file storage directory, a path can be further defined by a list of a root level folder and any one or more nested subfolders leading to the file name. The path can form a uniform resource locator defining a unique pathway to the file on the file storage device.

Example non-limiting examples of file storage directories that can be used with various embodiments herein include Unix, Apple's Hierarchical File System, HFS+ and Apple File System, FAT file system in Microsoft Windows, NTFS file system in Windows NT, and ODS-2 (On-Disk Structure-2) and higher levels of the Files-11 file system in OpenVMS.

A component of software configuration management, revision control, also known as version control or source control, is the management of changes to files, which may contain documents, computer programs, other collections of information, etc. Changes can be identified in a folder name and/or file name by a number or letter code, termed the "revision number", "revision level", or simply "revision". For example, an initial set of files is "(0)" or "revision 0". When the first change is made, the resulting set is "(1)" or "revision 1", and so on. Each revision may be identified with metadata that identifies the change, a timestamp, and/or the user making the change.

Some embodiments herein may be used with revision control software, such as Harvest Software Change Management by CA Technologies, which is a software tool for configuration management, e.g., revision control and SCM, of source code and other software development assets. The revision control software can operate to track and provide control over changes to files, such as source code files developed during any phase of a software engineering lifecycle.

In the context of software development, as teams design, develop and deploy software, it is common for multiple versions of the same software to be stored in different file storage directories on different file storage devices and for the software developers to be working simultaneously on updates to their respective copies. During software development it can be important for developers to be able to retrieve, edit, and run different versions of the software from different file storage directories, such as to determine in which software version(s) a problem occurs. It may also be necessary to develop two versions of the software concurrently. Developers may retain multiple copies of the different versions of the program, and rename the original files as desired. This approach can result in many near-identical copies of the files being maintained in separate file storage directories.

FIG. 1 illustrates a source file storage directory and a target file storage directory that are displayed in separate windows that may be manually compared by a user to determine inconsistencies in accordance with a prior art approach for merging source and target file storage directories. Referring to FIG. 1, the file "PathBuilder.java" within the source file storage directory has been renamed "PathConstructor.java" within the target file storage directory, however no operations are provided by the underlying tool to identify their associated link or, much less, to visually indicate a link or other information that informs a user of the associated link between those files. The tool does not operate to identify the two files as refactorings of each other. Similarly, the file "Enumerators.java" within the source file storage directory has been renamed "Enums.java" within the target file storage directory, although again the tool performs no operations to identify the associated link and, much less, to visually indicate the link between those files. With still a further example, the subfolder "utilities", containing "PathBuilder.java" file and "UserProperties.java" file, within the source file storage directory has been renamed "utils", and also containing those two files, within the target file storage directory. The tool again performs no operations to identify the associated link and, much less, to visually indicate the link between those subfolders.

Consequently, the process of merging the source and target file storage directories is complicated by a lack of any information provided to a user as to what inconsistencies exist between the directories, and moreover by the lack of any information provided to a user as to what operations can be performed to resolve at least some of the inconsistencies. The operations that may be performed on files and/or folders to resolve inconsistencies during the merge can include, but are not limited to: adding, deleting, moving, and renaming Merging the directories becomes a manually laborious process that is time consuming and error prone.

Various embodiments of present disclosure operate to provide a graphical user interface (GUI) for merging source and target file storage directories. The GUI visually displays representations of the hierarchical structures of the source and target file storage directories. The operations display graphical interconnections that extend at least partially between locations of at least some inconsistencies identified in the displayed representations of the hierarchical structures, and display refactoring action indicia that are user selectable and are associated with defined actions performed to modify the hierarchical structure identified by the target file storage directory to resolve at least some of the inconsistencies. The operations also merge the source and target file storage directories including by performing the defined actions associated with user selected ones of the refactoring action indicia to generate a refactored target file storage directory that has the at least some of the inconsistencies resolved.

Figure 2:
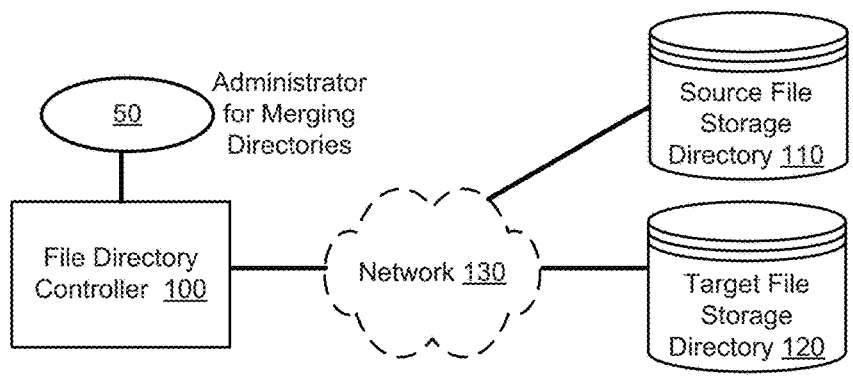
FIG. 2 is a block diagram of a file directory controller that merges a source file storage directory and a target file storage directory using operations configured according to some embodiments of the present disclosure.

FIG. 2 is a block diagram of a file directory controller 100 that merges a source file storage directory 110 for files located on a file storage device and a target file storage directory 120 for files located on the same or another file storage device using operations configured according to some embodiments of the present disclosure. The file directory controller 100 provides a graphical user interface that is displayed on a display device 50 to a user administrator who is managing the operations for merging content of the directories 110 and 120. The file directory controller 100 may be connected to the directories 110 and 120 through one or more data networks 130, e.g., public networks (Internet) and/or private networks.

Figure 11:
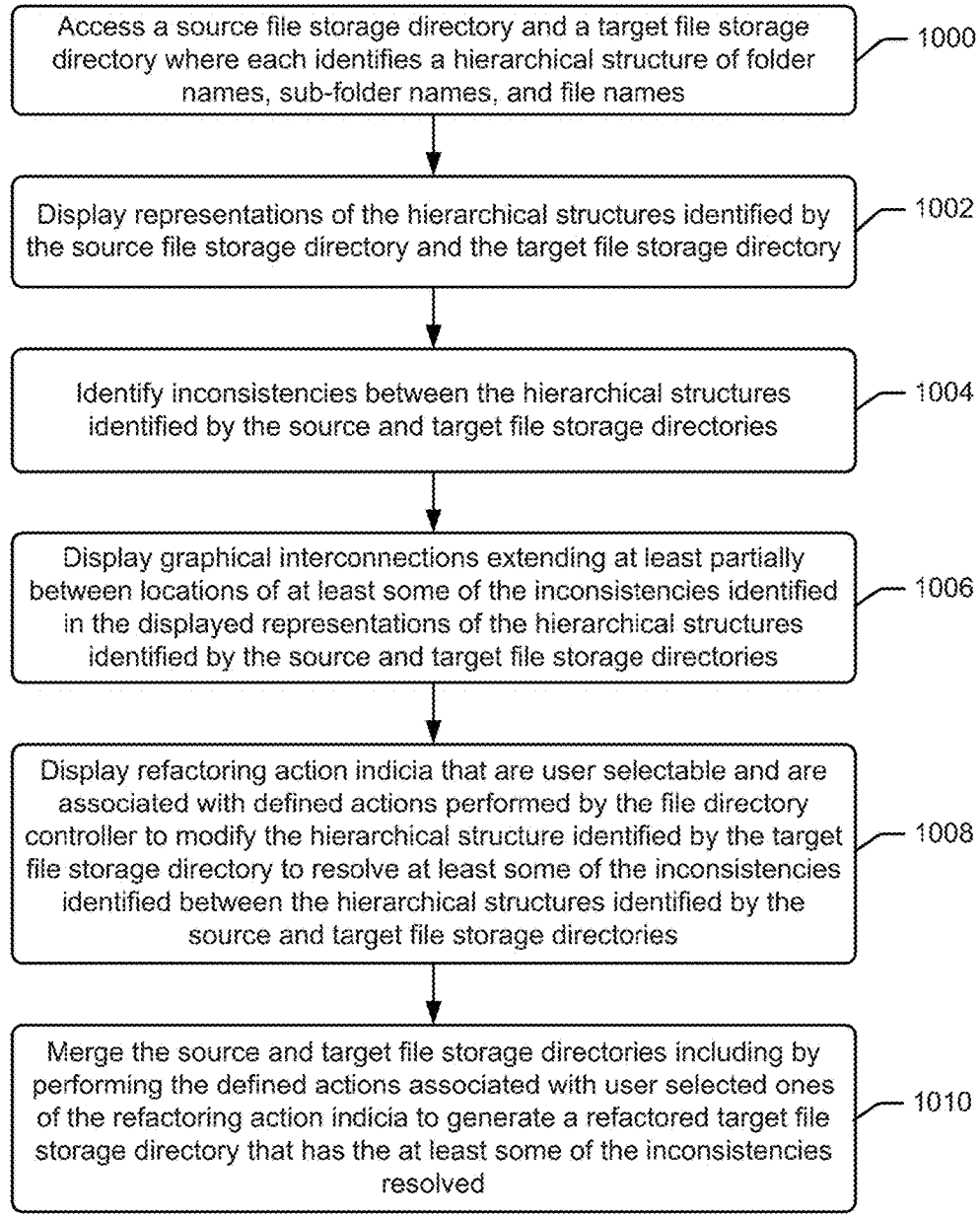
FIG. 11 is a flowchart of operations performed by the file directory controller of FIG. 2 to perform, for example, one or more of the embodiments of FIGS. 3-8 and 12 in accordance with some embodiments of the present disclosure.

FIGS. 3-8 and 12 are windows generated on the display device 50 using operations for displaying representations of hierarchical structures of the source and target file storage directories 110 and 120, displaying graphical interconnections between inconsistencies in the hierarchical structures, displaying refactoring action indicia, and the result of merging the source and file storage directories while resolving at least some of the inconsistencies in accordance with some embodiments of the present disclosure. FIG. 11 is a flowchart of operations performed by a processor of the file directory controller 100 to, for example, perform one or more of the embodiments of FIGS. 3-8 and 12 in accordance with some embodiments of the present disclosure.

Figure 3:
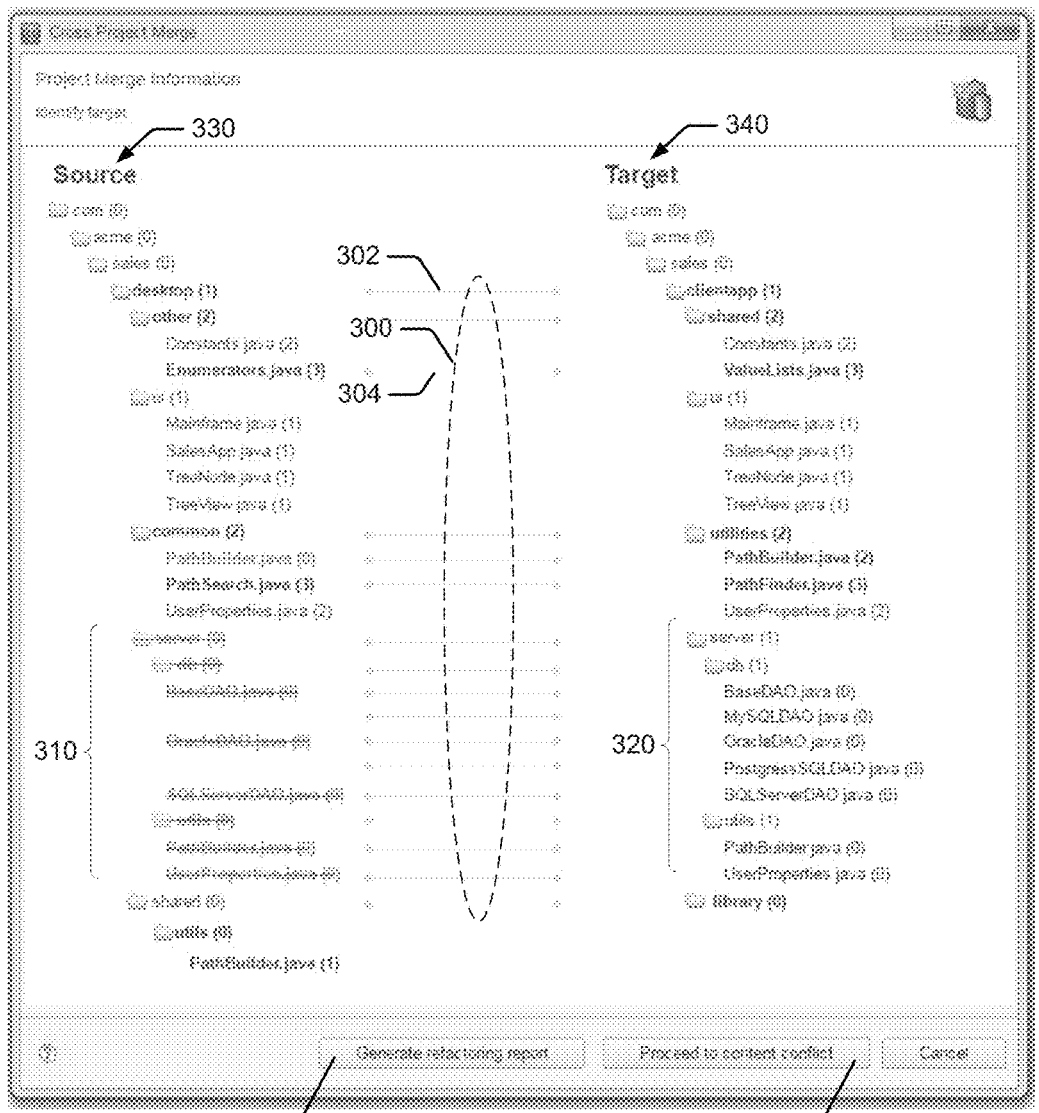
FIGS. 3-8 and 12 are windows generated on a display device using operations for displaying representations of hierarchical structures of the source and target file storage directories, for displaying graphical interconnections between inconsistencies in the hierarchical structures, for displaying refactoring action indicia, and for displaying the result of merging the source and file storage directories while resolving at least some of the inconsistencies in accordance with some embodiments of the present disclosure.
Figure 10:
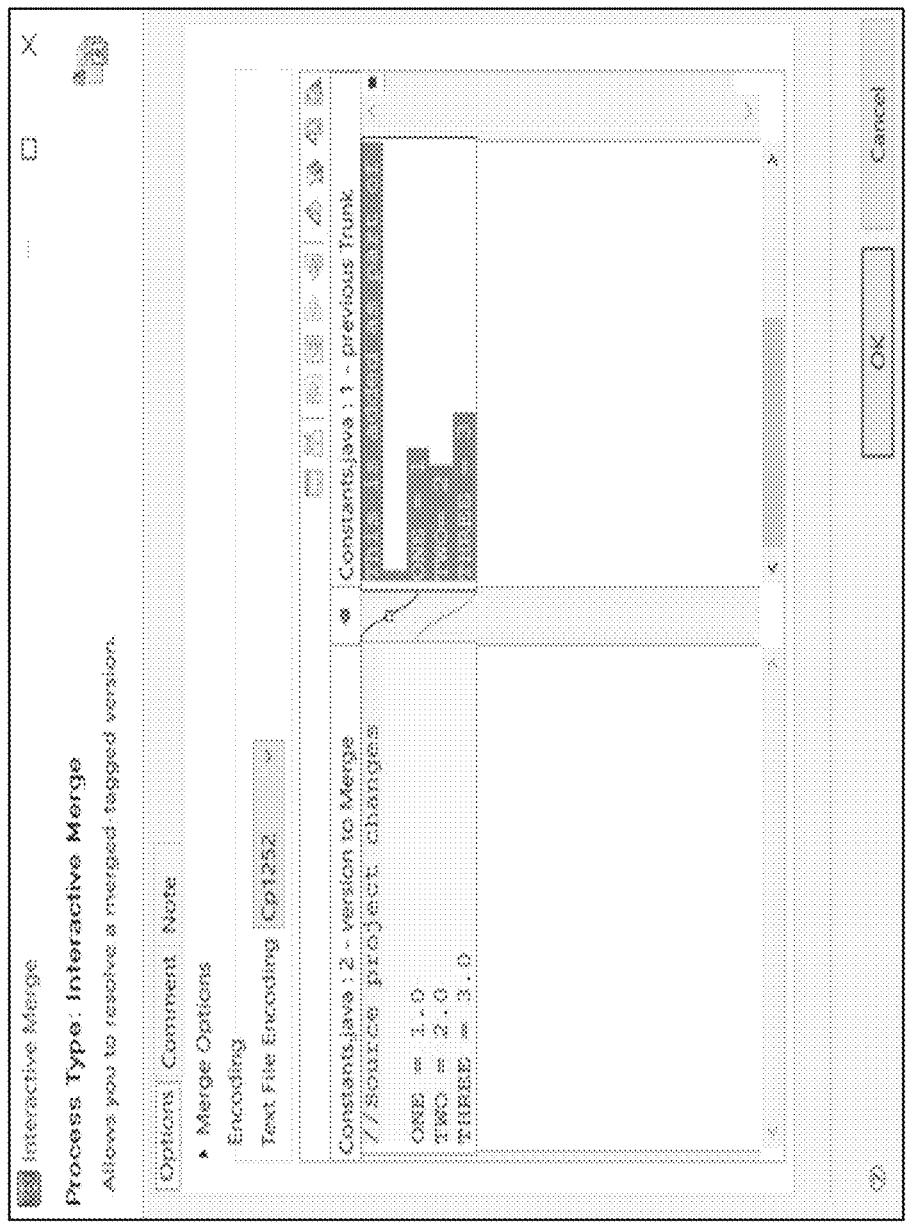

Referring to FIGS. 3 and 10, the file directory controller 100 accesses (block 1000) the source file storage directory 110 and the target file storage directory 120. Each of the directories 110 and 120 identify a hierarchical structure of folder names, subfolder names, and file names. The file names identify addressable locations on at least one file storage device where files are stored. The hierarchical structure defines a pathway to the respective filenames located in the folders and subfolders.

The file directory controller 100 displays (block 1002), on the display device 50, representations of the hierarchical structures identified by the source file storage directory 110 and the target file storage directory 120. Referring to the example GUI shown in FIG. 3, the operations to display representations of the hierarchical structures can include, for each of the source file storage directory 110 and the target file storage directory 120, displaying a listing 330 and 340 of at least some of the folder names, the subfolder names, and the file names, where the listing 330 (e.g., folder "com (0)" down to subfolder "utils (0))") displayed for the source file storage directory 110 is controlled to be spaced apart on the display device 50 from the listing 340 (e.g., folder "com (0)" down to subfolder "library (0)") displayed for the target file storage directory 120. The operations for displaying graphical interconnections that extend at least partially between locations of at least some of the inconsistencies, can include for each of at least some of the graphical lines 300, displaying the graphical line to extend at least partially between a location in each of the listings that corresponds to where one of the file names in the hierarchical structure of the source file storage directory has been moved to and/or renamed as one of the file names in the hierarchical structure of the target file storage directory.

In the example of FIG. 3, a graphical line 302 has been drawn between the folder "desktop (1)" in the source file storage directory 110 and the folder "clientapp (1)" in the target file storage directory 120, in response to the controller 100 identifying the inconsistency between the folders due to the source folder being renamed as the target folder. Similarly, another graphical line 304 has been drawn between the file "Enumerators.java (3)" in the source file storage directory 110 and the file "ValueLists.java (3)" in the target file storage directory 120, in response to the controller 100 identifying the inconsistency between the file names due to the source file name being renamed as the target file name.

FIG. 3 further illustrates operations by the controller 100 to display a group 310 of file names in the listing for the source file storage directory 110 marked with a deletion graphical indicia (e.g., strikethrough indication in the folder names and file names) responsive to identifying in the inconsistencies that the group 310 of file names were not present in the listing for the source file storage directory 110 (before modification to include the group 310 of file names with the deletion graphical indication) and were added as the group 320 to the listing for the target file storage directory 120.

The file directory controller 100 further operates to display (block 1008), on the display device 50, refactoring action indicia that are user selectable and are associated with defined actions performed by the file directory controller 100 to modify the hierarchical structure identified by the target file storage directory 120 to resolve at least some of the inconsistencies identified between the hierarchical structures identified by the source file storage directory 110 and the target file storage directory 120.

Figure 4:
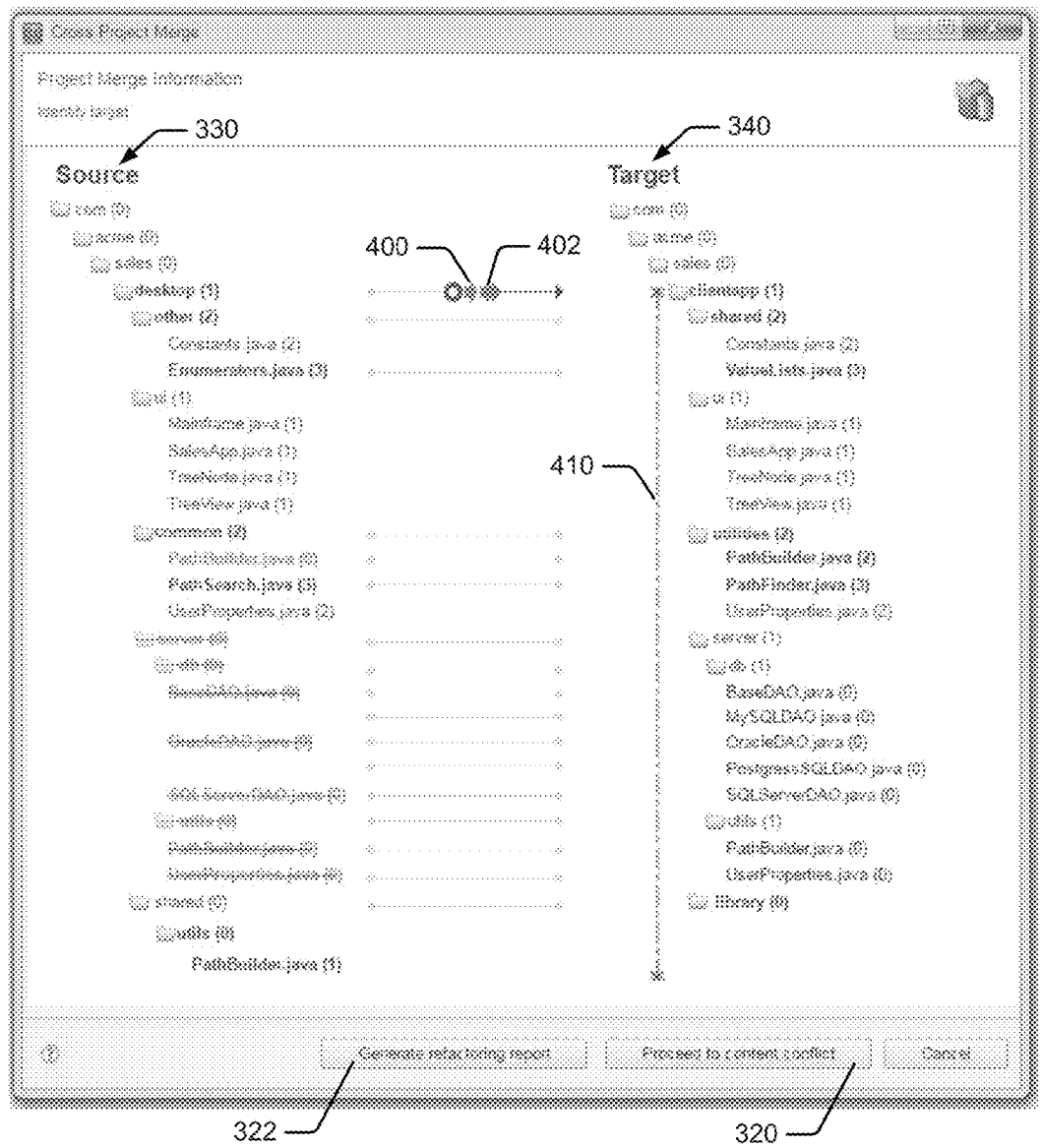

In the example GUI of FIG. 4, the file directory controller 100 displays the refactoring action indicia at least partially overlapping associated graphical lines that extend at least partially between the inconsistencies that are respectively resolved by the defined actions associated with the refactoring action indicia. Responsive to a user moving a mouse cursor to hover over one of the lines extending between the inconsistency identified by the source folder "desktop (1)" being renamed to the target folder "clientapp (1)", the controller 100 responsively displays a pair of the refactoring action indicia 400 (e.g., single arrow) and 402 (e.g., double arrow) that overlap that line.

Responsive to a user further moving the mouse cursor to hover over the refactoring action indicia 400 (e.g., single arrow), the controller 100 responsively displays the bracketed line 410 which extends along a portion of the list 340 that corresponds to subfolders and files contained within the target folder "clientapp (1)". A user may select the refactoring action indicia 400 (e.g., single arrow), such as by clicking thereon, to queue up an action that will rename the target folder "clientapp (1)" to match the source folder "desktop (1)" during merging (block 1010) of the source and target file storage directories 110 and 120.

Figure 5:
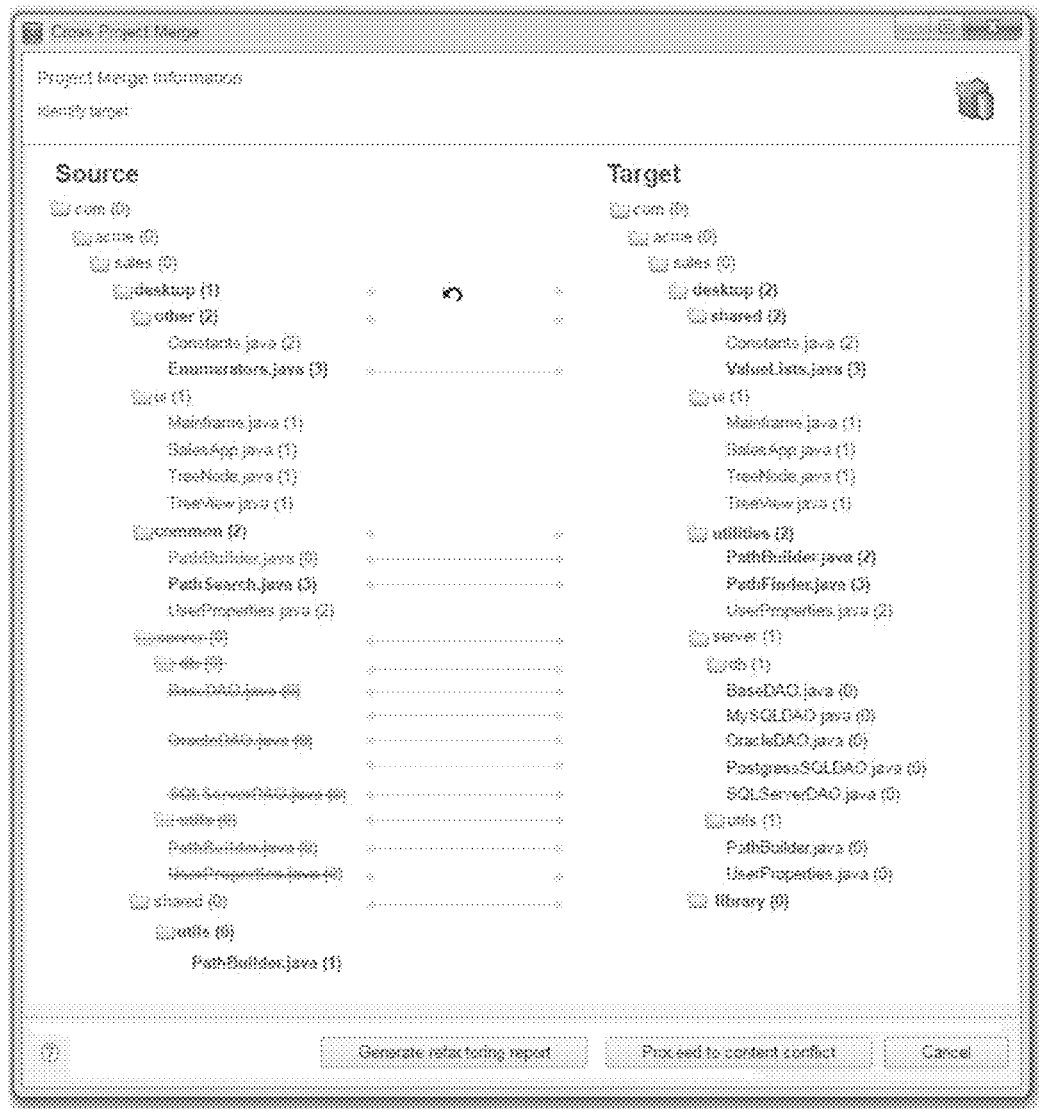

FIG. 5 illustrates the window that is displayed responsive to a user selecting the refactoring action indicia 400, showing that the previous target folder "clientapp (1)" has been renamed "desktop (2)" in the refactored target file storage directory, where the "(2)" can be used to indicate a second version of the original source "desktop" folder. The bracketed line 410 therefore visually illustrates to the user what portion of folders and files in the list 340 will be affected by the rename action. The controller 100 also displays an undo action (illustrated as a counterclockwise curved arrow) that a user can select to roll-back (undo) the changes caused by the rename action.

Thus, in some embodiments (e.g., FIGS. 4 and 5), one of the refactoring action indicia that can be displayed by the file directory controller 100 is a file rename action indicia 400 associated with an action that renames a file name. The file rename action indicia 400 is displayed overlapping one of the graphical lines that extends at least partially between a location in each of the listings that corresponds to where an original file name (e.g., "desktop (1)") in the hierarchical structure of the source file storage directory has been renamed as a renamed file name (e.g., "clientapp (1)") in the hierarchical structure of the target file storage directory. The operations performed by the file directory controller 100 to merge (block 1010) the source file storage directory 110 and the target file storage directory 120 can include: responsive to when the file rename action indicia (e.g., 400) is selected by the user, generating (e.g., initiated responsive to a user selecting the "proceed to content conflict" button 320) the refactored target file storage directory to include the renamed file name in the hierarchical structure of the target file storage directory 120 in place of the original file name in the hierarchical structure of the source file storage directory 110; and, alternatively, responsive to when the file rename action indicia (e.g., 400) is not selected by the user, generating (e.g., initiated responsive to a user selecting the "proceed to content conflict" button 320) the refactored target file storage directory to include the original file name in the hierarchical structure of the source file storage directory 110 in place of the renamed file name in the hierarchical structure of the target file storage directory 120.

Furthermore, responsive to detecting a mouse cursor hovering over the file rename action indicia (e.g., 400), the controller 100 displays the one of the graphical lines that extends at least partially between the location in each of the listings that corresponds to where the original file name (e.g., "desktop (1)") in the hierarchical structure of the source file storage directory 110 has been renamed as the renamed file name (e.g., "clientapp (1)") in the hierarchical structure of the target file storage directory 120.

Figure 6:
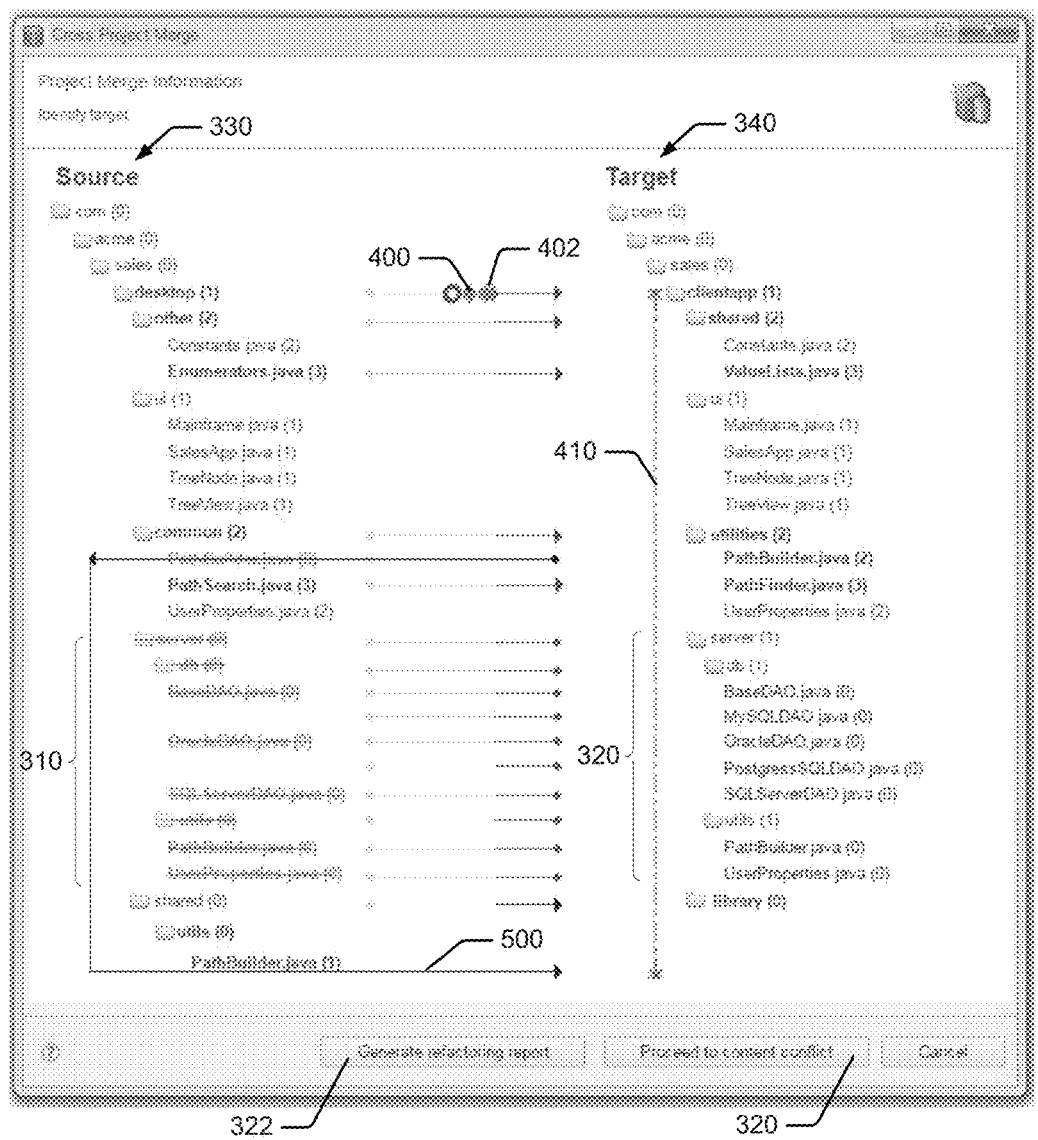

In a further embodiment, responsive to a user moving the mouse cursor to hover over the other refactoring action indicia 402 (e.g., double arrow), the controller 100 responsively displays the window shown in FIG. 6 which visually indicates all actions that will be taken, if the indicia 402 is selected, to resolve all inconsistencies between the displayed lists 330 and 340 by renaming, moving, and deleting folders and files shown in the target list 340 to conform with that shown in the source list 330. For example, as shown in FIG. 6, the illustrated actions to resolve inconsistencies include: 1) renaming the target folder "clientapp (1)" based on the source folder name "desktop (1)"; 2) renaming the target folder "shared (2)" based on the source folder name "other (2)"; 3) renaming the target file "ValueLists.java (3)" based on the source file name "Enumerators.java (3)"; 4) renaming the target folder name "utilities (2)" based on the source folder name "common (2)"; 5) moving the target file name "PathBuilder.java (2)" from the target folder "utilities (2)" down to be within a subfolder name "utils (0)" under folder "shared (0)" as shown by the displayed line pathway 500; and 6) deleting the group of files 320 from the target list 340 as visually indicated by the strikethrough lines in the folders and files illustrated in the source group 310 of the source list 330.

Figure 7:
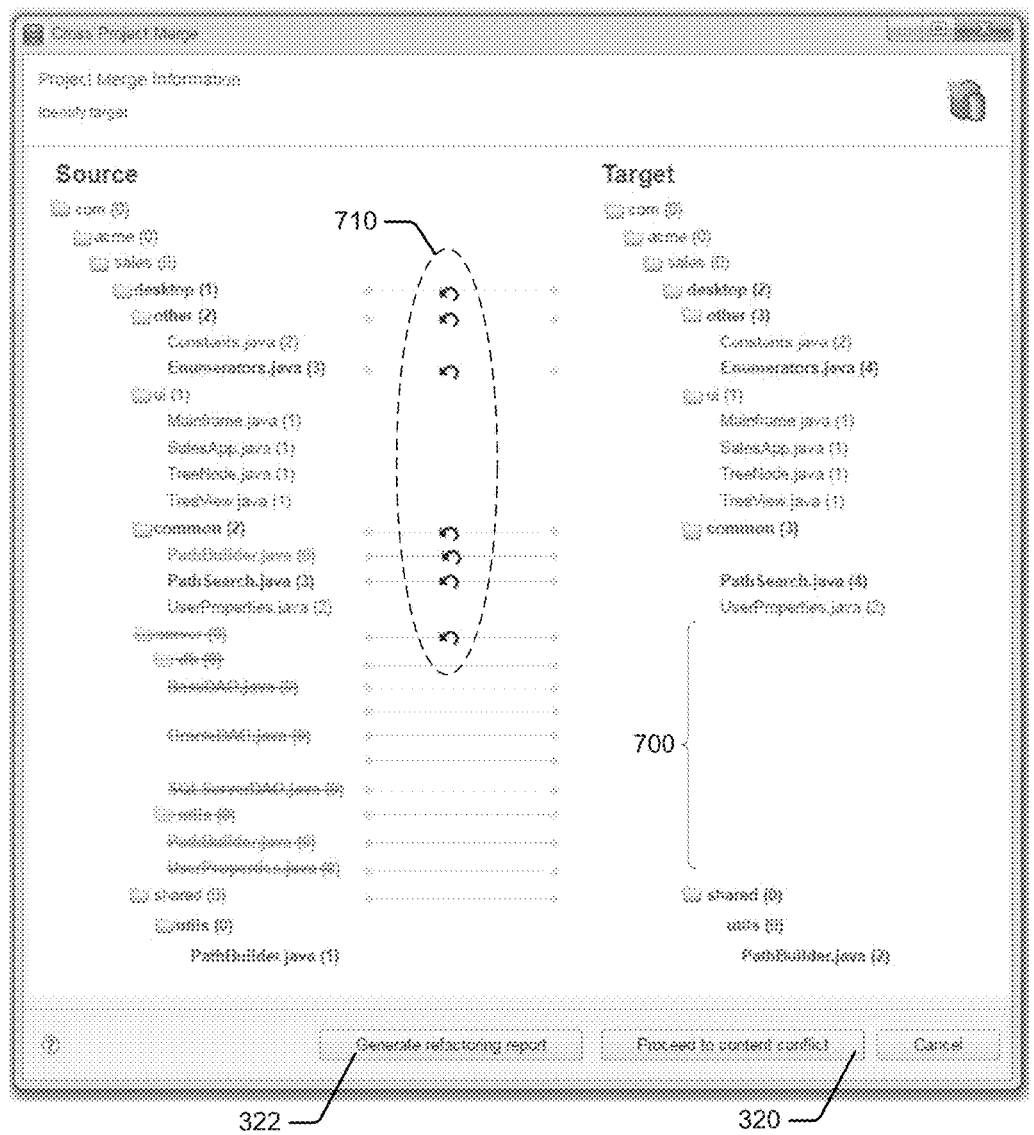

FIG. 7 illustrates the window that is displayed by the controller 100 responsive to the user selecting the refactoring action indicia 402 and the controller 100 performing the associated actions to resolve inconsistencies. The controller 100 also displays undo actions (illustrated as a counterclockwise curved arrow) overlapping each of the lines between resolved inconsistency that a user can select among to roll-back (undo) the associated changes caused by the associated action that was performed to resolve the corresponding inconsistency.

The user may select a "generate refactoring report" action 322 to generate a refactoring report that lists actions that have been queued for execution during merging of the source and target file storage directories 110 and 120. Alternatively, the user may select a "proceed to content conflict" action 320 to trigger the controller 100 to begin merging (block 1010) the source file storage directory 110 and the target file storage directory 120 including by performing the defined actions associated with user selected ones of the refactoring action indicia (e.g., the user's selection of the refactoring action indicia 400 (e.g., single arrow) or 402 (e.g., double arrow)) to generate a refactored target file storage directory that has the inconsistencies resolved.

The files that are now addressed by the hierarchical structure (e.g., directory pathways and file names) identified by the refactored target file storage directory are now used by a computer, such as the controller 100, to read files from and to write files to locations on one or more file storage devices that are addressed by the hierarchical structure of the refactored target file storage directory. Merging the source and target file storage directories to form one centralized refactored target file storage directory eliminates the need for partially redundant source and target file storage directories and the associated duplicative versions of files therein. The partially redundant source and target file storage directories can be deleted by the controller 100 from the file storage device(s) after generation of the single refactored target file storage directory, which reduces the complexity of file input and output operation to the file storage devices. The files that were referenced by the source and target file storage directories but are not referenced by the refactored target file storage directory can be deleted by the controller 100 from the file storage device to increase available file storage space. Moreover, the single refactored target file storage directory improves file search efficiency when an application or operating system is searching one or more file storage devices for a particular file. Significant reductions in processor circuit computation cycles and file input and output operations are achieved by search operations that perform file name or file content keyword searches through a single refactored target file storage directory instead of through the source and target file storage directories.

Figure 8:
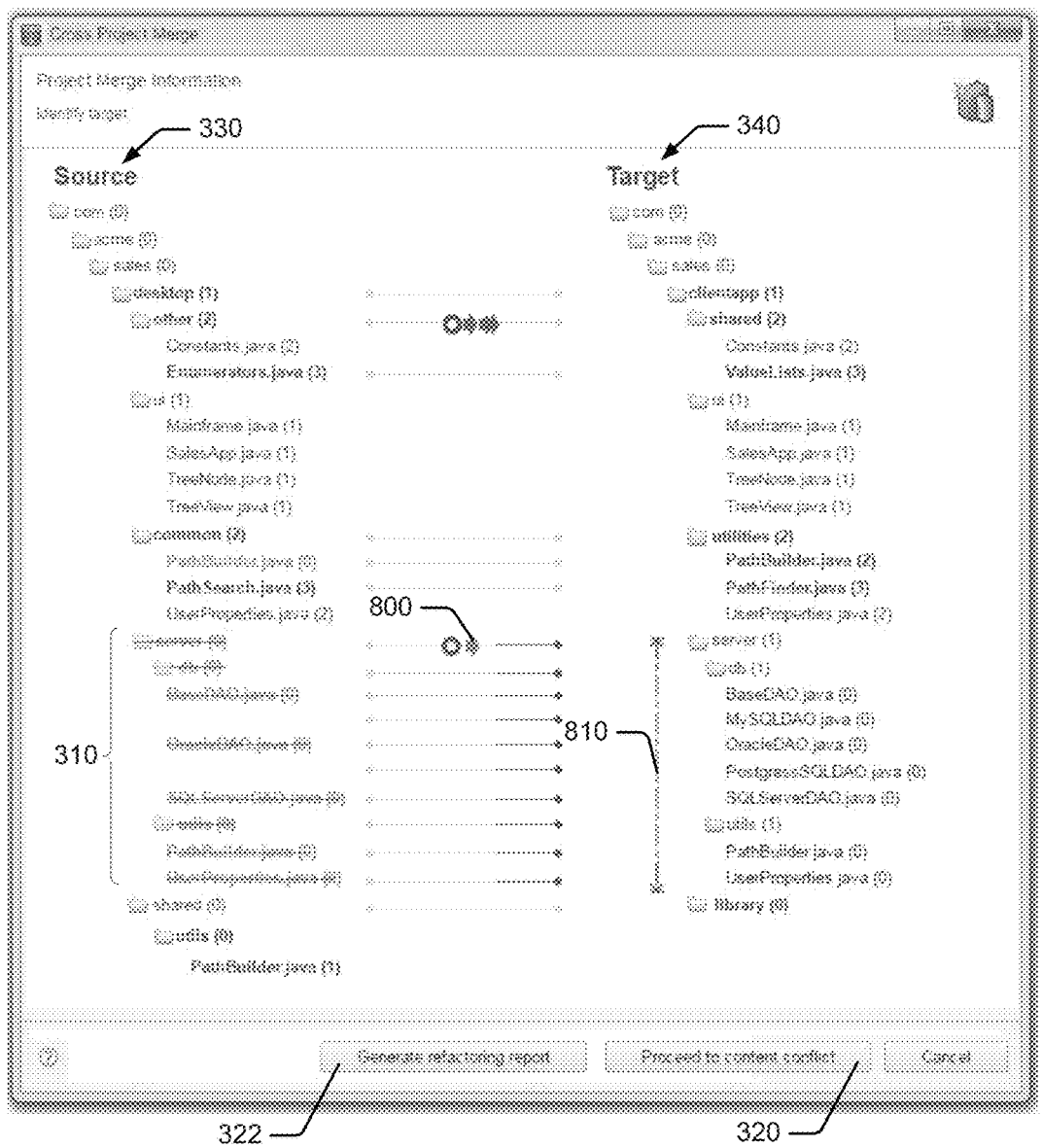

Referring back to FIG. 4, the user may move the mouse cursor to hover over the line extending between the source folder "server (0)" and the target folder "server (1)" to cause the controller 100 to display the refactoring action indicia 800 shown FIG. 8. Responsive to a user then hovering the mouse cursor over the refactoring action indicia 800, the controller 800 displays the bracketed line 810 to indicate the group of target folders and files that were added to the target list 340 and which are not contained in the original source list 330, as indicated by the folders and files being illustrated with strikethrough lines. The user may select the refactoring action indicia 800 to remove the group of target folders and files marked by the bracketed line 810 during merging of the source and target file storage directories 110 and 120 to generate the refactored target file storage directory.

Accordingly, in some embodiments the file directory controller 100 displays (block 1008) a group of the file names in the listing for the source file storage directory using a deletion graphical indicia (e.g., single arrow 800 and the strikethrough lines shown in folder names and file names within group 310) responsive to identifying in the inconsistencies that the group of file names 310 in the listing 330 for the source file storage directory 110 were added to the listing 340 for the target file storage directory 120. The controller selectively displays the deletion graphical indicia (e.g., single arrow 800 and the strikethrough lines shown in folder names and file names within group 310) responsive to detecting a mouse cursor hovering over the deletion action indicia 800 associated with a file deletion action for the group 310 of file names and folder names.

The operations for merging (block 1010) the source target file storage directories 110 and 120, e.g., as shown in FIG. 8, can include: 1) responsive to when the deletion action indicia 800 is selected by the user, generating the refactored target file storage directory to not include the group 310 of file names and folder names from the listing 330 for the source file storage directory 110 that were added to the listing 340 for the target file storage directory 120; and alternatively 2) responsive to when the deletion action indicia 800 is not selected by the user, generating the refactored target file storage directory to include the group 310 of file names and folder names from the listing 330 for the source file storage directory 110 that were added to the listing 340 for the target file storage directory 120.

Referring again to FIG. 11, in some embodiments the operations performed by the file directory controller 100 to identify (block 1004) inconsistencies between the hierarchical structures identified by the source and target file storage directories 110 and 120, include accessing a tracked changes directory that identifies changes that have been performed over time as the hierarchical structure identified by the source file storage directory 110 is modified to provide the target file storage directory 120. The tracked changes directory may identify file names and/or folder names in the hierarchical structure of the source file storage directory 110 that have been renamed, deleted, added, or moved during generation of the target file storage directory 120. The tracked changes directory may be provided by, for example, the Harvest Software Change Management tool developed by CA Technologies, or provided by another revision control tool.

Figure 12:
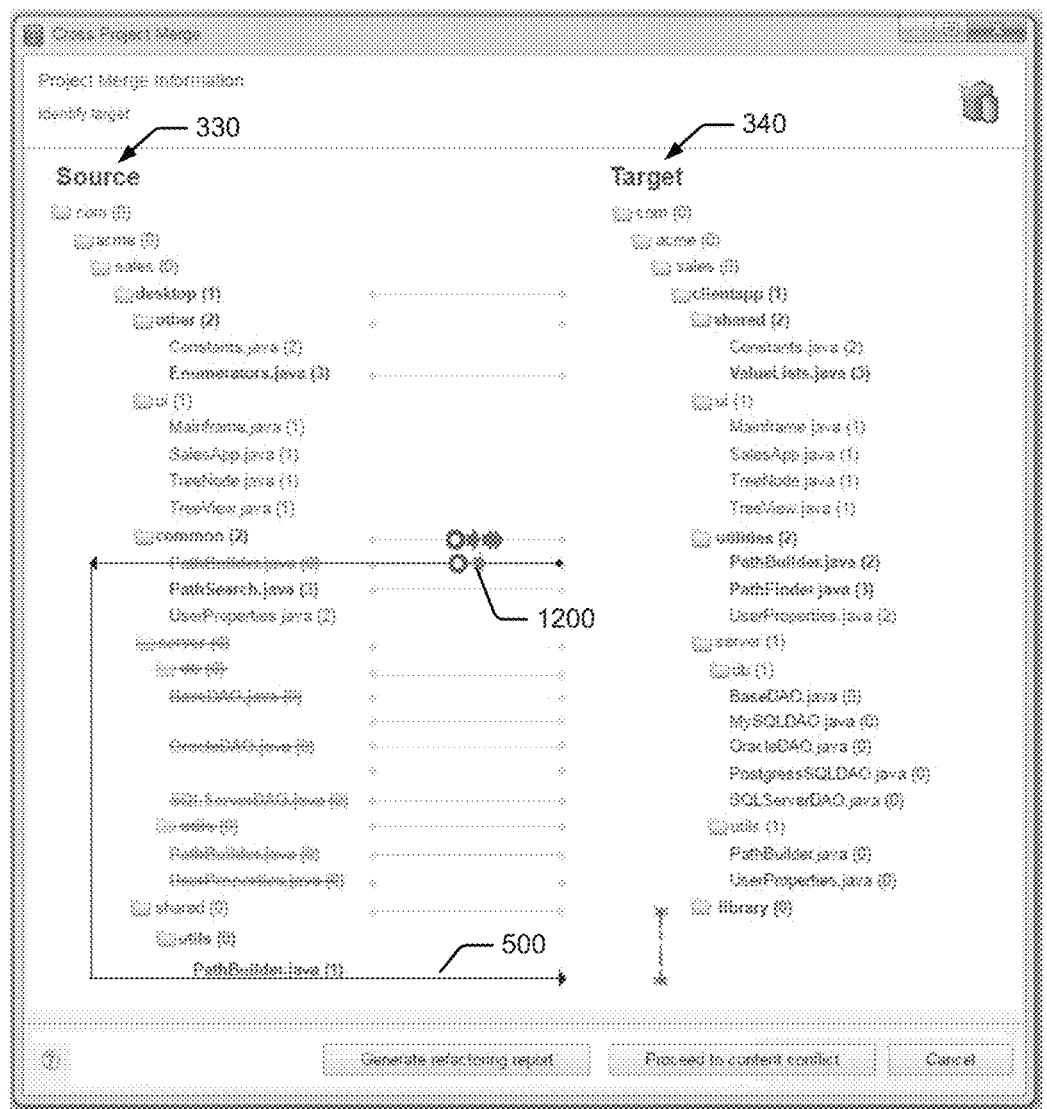

Referring to FIGS. 11 and 12, one of the refactoring action indicia includes a file move action indicia 1200 associated with an action that moves a location of a file name (e.g., "PathBuilder.java (0)") in the hierarchical structure of the source file storage directory 110 to another location (subfolder "utils (0)" within folder "shared (0)") in the hierarchical structure of the target file storage directory 120.

The file rename action indicia is displayed overlapping one of the graphical lines that extends at least partially between a location in each of the listings that corresponds to where a file name in the hierarchical structure of the source file storage directory has been moved to in the hierarchical structure of the target file storage directory. The operations to merge (block 1010) the source file storage directory 110 and the target file storage directory 120 then includes: 1) responsive to when the file move action indicia (e.g., 1200) is selected by the user, generating the refactored target file storage directory to include the file name at a location corresponding to the location of the file name in the hierarchical structure of the source file storage directory 120; and alternatively 2) responsive to when the file move action indicia (e.g., 1200) is not selected by the user, generating the refactored target file storage directory to include the file name at a location corresponding to the location of the file name in the hierarchical structure of the target file storage directory 110. Responsive to the file directory controller 100 detecting a mouse cursor hovering over the file move action indicia 1200 in FIG. 12, the controller 100 displays the graphical line 500 that extends at least partially between the location in each of the listings that corresponds to where the file name in the hierarchical structure of the source file storage directory 110 has been moved to in the hierarchical structure of the target file storage directory 120. The user is thereby visually informed as to what directories or files will be affected if the indicia 1200 is selected to trigger performance of the associated action.

Figure 9:
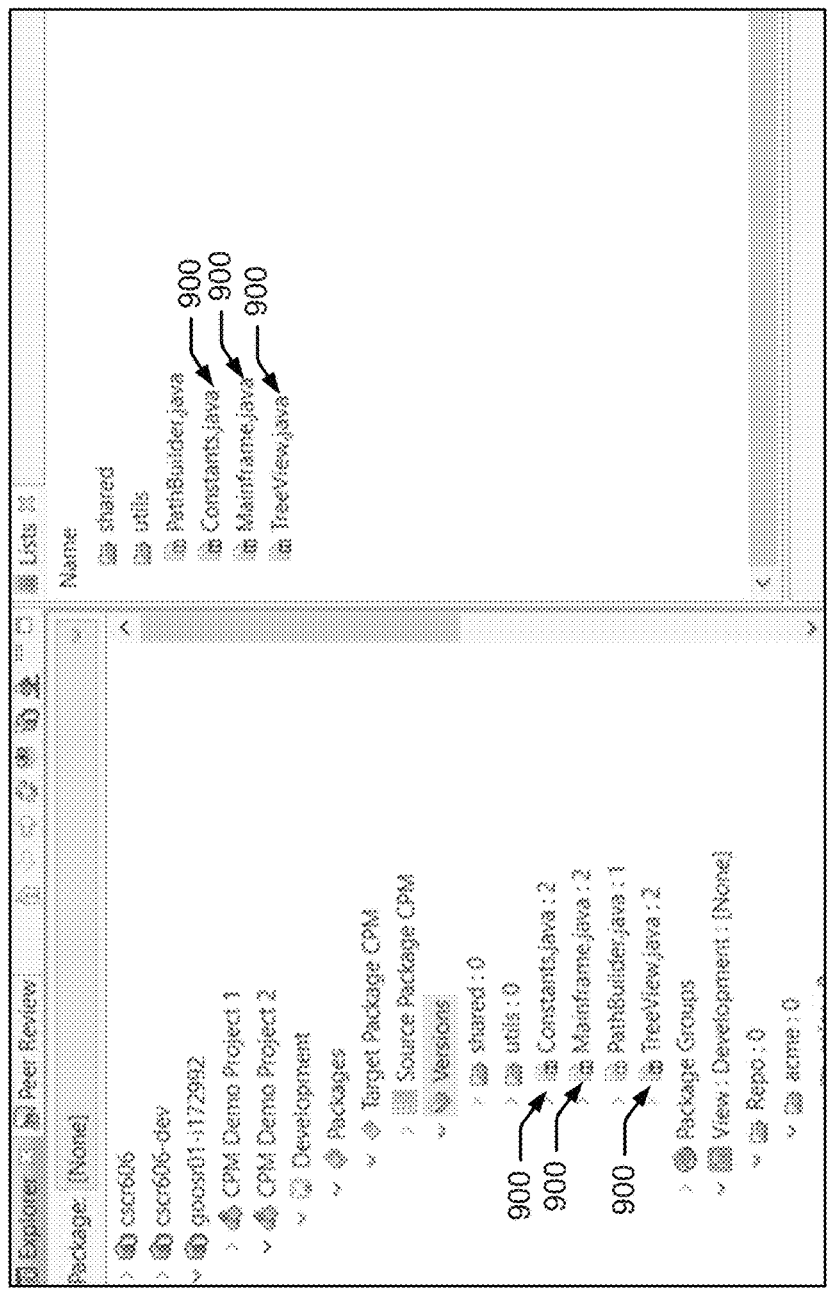
FIGS. 9 and 10 illustrates windows generated on a display device during operations to resolve content conflicts between files in accordance with some embodiments.

Responsive to a user selecting the "proceed to content conflict" button 320, the file directory controller 100 performs operations to merge (block 1010, FIG. 11) the directories 110 and 120. The controller 110 may compare content during or after the merge (block 1010, FIG. 11) and display further windows that identify which files contain different content, such when a source file contains different source code lines then the corresponding target file. FIGS. 9 and 10 illustrates to windows displayed on a display device during operations to resolve content conflicts between files in accordance with some embodiments.

FIG. 9 shows lists of files that are displayed by the controller 100. The controller has marked some of the files with the letter "M", indicated by reference 900, to indicate that the controller 100 has identified that these particular source and target files have differences in their content (inconsistencies) which need to be resolved during merging (block 1010) to generate the refactored target file storage directory. The user may select (e.g., using the mouse cursor) one of the listed files to cause the controller 100 to display locations of conflicting content in the two files. In the example of FIG. 9, the use can select the file named "Constants.java" to cause the controller 100 to display the screen shown in FIG. 10, which displays a section of software code contained in the file named "Constants.java" in the source file storage directory 110 and in the file named "Constants.java" in the target file storage directory 120. The user may thereby visually observe the conflicting content, and may select or edit the content that is to be included in the selected file within the refactored target file storage directory.

Figure 13:
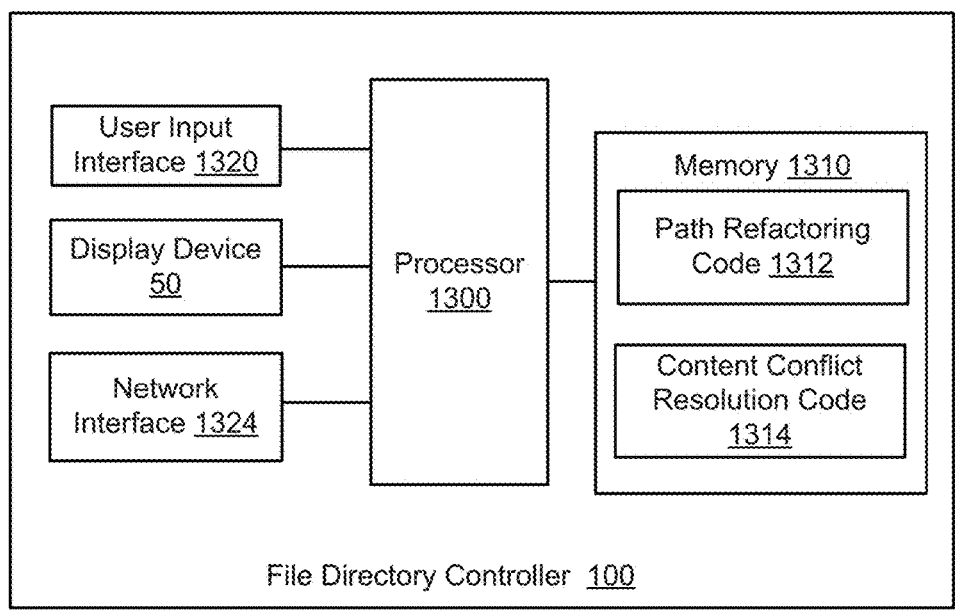
FIG. 13 is a block diagram of a file directory controller that is configured according to some embodiments.

FIG. 13 is a block diagram of the file directory computer 100 which performs operations according to one or more embodiments herein to merge a source file storage directory and a target file storage directory. The file directory computer 100 includes a processor 1300, a memory 1310, and a network interface 1324 which may include a wired network interface (e.g., Ethernet interface) and/or a radio access transceiver that communicates with the one or more file storage devices where files identified by the source file storage directory and the target file storage directory are stored.

The processor 1300 may include one or more data processing circuits, such as a general purpose and/or special purpose processor (e.g., microprocessor and/or digital signal processor) that may be collocated or distributed across one or more networks. The processor 1300 is configured to execute computer program code in the memory 1310, described below as a non-transitory computer readable medium, to perform at least some of the operations described herein as being performed by an application analysis computer. The computer program code may include path refactoring code 1312 that can perform one or more of the operations of FIGS. 3-8 and 11, and may include content conflict resolution code 1314 that can perform one or more the operations shown in FIGS. 9 and 10 based on one or more of the embodiments disclosed herein. The file directory computer 100 further includes a user input interface 1320 (e.g., touch screen, keyboard, keypad, etc.) and the display device 50.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
performing operations as follows on a processor of a file directory controller:
accessing a source file storage directory and a target file storage directory where each identifies a hierarchical structure of folder names, subfolder names, and file names, the file names identifying addressable locations on at least one file storage device where files are stored;
displaying, on a display device, representations of the hierarchical structures identified by the source file storage directory and the target file storage directory, wherein displaying the representations comprises, for each of the source file storage directory and the target file storage directory, displaying a listing of at least some of the folder names, the subfolder names, and the file names, wherein the listing displayed for the source file storage directory is controlled to be spaced apart on the display device from the listing displayed for the target file storage directory;
identifying inconsistencies between the hierarchical structures identified by the source file storage directory and the target file storage directory;
displaying, on the display device, graphical interconnections extending at least partially between locations of at least some of the inconsistencies identified in the displayed representations of the hierarchical structures identified by the source file storage directory and the target file storage directory, wherein displaying the graphical interconnections comprises, for each of at least some of the graphical interconnections, displaying a graphical line to extend at least partially between a location in each of the listings that corresponds to where one of the file names in the hierarchical structure of the source file storage directory has been moved to and/or renamed as one of the file names in the hierarchical structure of the target file storage directory;
displaying, on the display device, refactoring action indicia that are user selectable, wherein, responsive to selection of the refactoring action indicia, defined actions are queued to be performed by the file directory controller to modify the hierarchical structure identified by the target file storage directory to resolve at least some of the inconsistencies identified between the hierarchical structures identified by the source file storage directory and the target file storage directory, wherein one of the refactoring action indicia comprises a file rename action indicia associated with an action that renames a file name, and wherein the file rename action indicia is displayed relative to one of the graphical lines that extends at least partially between a location in each of the listings that corresponds to where an original file name in the hierarchical structure of the source file storage directory has been renamed as a renamed file name in the hierarchical structure of the target file storage directory; and
merging the source file storage directory and the target file storage directory including by performing the defined actions queued in response to selection of the refactoring action indicia to generate a refactored target file storage directory that has the at least some of the inconsistencies resolved, wherein merging the source file storage directory and the target file storage directory comprises:
responsive to when the file rename action indicia is selected by the user, generating the refactored target file storage directory to include the original file name in the hierarchical structure of the source file storage directory in place of the renamed file name in the hierarchical structure of the target file storage directory; and
responsive to when the file rename action indicia is not selected by the user, generating the refactored target file storage directory to include renamed file name in the hierarchical structure of the target file storage directory in place of the original file name in the hierarchical structure of the source file storage directory.

2. The method of claim 1, wherein the identifying inconsistencies between the hierarchical structures identified by the source file storage directory and the target file storage directory, comprises:
accessing a tracked changes directory that identifies changes that have been performed over time as the hierarchical structure identified by the source file storage directory is modified to provide the target file storage directory.

3. The method of claim 2, wherein the tracked changes directory identifies file names in the hierarchical structure of the source file storage directory that have been renamed, deleted, added, and moved during generation of the target file storage directory.

4. The method of claim 1, wherein the displaying refactoring action indicia, comprises:
for each at least some of the refactoring action indicia, displaying the refactoring action indicia at least partially overlapping one of the graphical lines that extends at least partially between one of the inconsistencies that is resolved by the defined action associated with the refactoring action indicia.

5. The method of claim 1, further comprising:
responsive to detecting a mouse cursor hovering over the file rename action indicia, displaying the one of the graphical lines that extends at least partially between the location in each of the listings that corresponds to where the original file name in the hierarchical structure of the source file storage directory has been renamed as the renamed file name in the hierarchical structure of the target file storage directory.

6. A method comprising:
performing operations as follows on a processor of a file directory controller:
accessing a source file storage directory and a target file storage directory where each identifies a hierarchical structure of folder names, subfolder names, and file names, the file names identifying addressable locations on at least one file storage device where files are stored;
displaying, on a display device, representations of the hierarchical structures identified by the source file storage directory and the target file storage directory, wherein displaying the representations comprises, for each of the source file storage directory and the target file storage directory, displaying a listing of at least some of the folder names, the subfolder names, and the file names, wherein the listing displayed for the source file storage directory is controlled to be spaced apart on the display device from the listing displayed for the target file storage directory;

identifying inconsistencies between the hierarchical structures identified by the source file storage directory and the target file storage directory;

displaying, on the display device, graphical interconnections extending at least partially between locations of at least some of the inconsistencies identified in the displayed representations of the hierarchical structures identified by the source file storage directory and the target file storage directory, wherein displaying the graphical interconnections comprises, for each of at least some of the graphical interconnections, displaying a graphical line to extend at least partially between a location in each of the listings that corresponds to where one of the file names in the hierarchical structure of the source file storage directory has been moved to and/or renamed as one of the file names in the hierarchical structure of the target file storage directory;

displaying, on the display device, refactoring action indicia that are user selectable, wherein, responsive to selection of the refactoring action indicia, defined actions are queued to be performed by the file directory controller to modify the hierarchical structure identified by the target file storage directory to resolve at least some of the inconsistencies identified between the hierarchical structures identified by the source file storage directory and the target file storage directory, wherein one of the refactoring action indicia comprises a file move action indicia associated with an action that moves a location of a file name in the hierarchical structure of the source file storage directory to another location in the hierarchical structure of the target file storage directory, and wherein the file move action indicia is displayed relative to one of the graphical lines that extends at least partially between a location in each of the listings that corresponds to where a file name in the hierarchical structure of the source file storage directory has been moved to in the hierarchical structure of the target file storage directory; and merging the source file storage directory and the target file storage directory including by performing the defined actions queued in response to selection of the refactoring action indicia to generate a refactored target file storage directory that has the at least some of the inconsistencies resolved, wherein merging the source file storage directory and the target file storage directory comprises:

responsive to when the file move action indicia is selected by the user, generating the refactored target file storage directory to include the file name at a location corresponding to the location of the file name in the hierarchical structure of the source file storage directory; and responsive to when the file move action indicia is not selected by the user, generating the refactored target file storage directory to include the file name at a location corresponding to the location of the file name in the hierarchical structure of the target file storage directory.

7. The method of claim 1, wherein:

the displaying, on the display device, representations of the hierarchical structures identified by the source file storage directory and the target file storage directory, comprises:

for each of the source file storage directory and the target file storage directory, displaying a listing of at least some of the folder names, the subfolder names, and the file names, wherein the listing displayed for the source file storage directory is controlled to be spaced apart on the display device from the listing displayed for the target file storage directory; and displaying a group of the file names in the listing for the source file storage directory using a deletion graphical indicia responsive to identifying in the inconsistencies that the group of file names in the listing for the source file storage directory were added to the listing for the target file storage directory.

8. The method of claim 7, further comprising:

selectively displaying the deletion graphical indicia responsive to detecting a mouse cursor hovering over one of the refactoring action indicia that is the deletion action indicia associated with a file deletion action for the group of file names.

9. The method of claim 8, wherein the merging the source file storage directory and the target file storage directory comprises:

responsive to when the deletion action indicia is selected by the user, generating the refactored target file storage directory to not include the group of file names from the listing for the source file storage directory that were added to the listing for the target file storage directory; and responsive to when the deletion action indicia is not selected by the user, generating the refactored target file storage directory to include the group of file names from the listing for the source file storage directory that were added to the listing for the target file storage directory.

10. A computer program product, comprising:

a non-transitory computer readable storage medium comprising computer readable program code embodied in the medium that when executed by a processor of a file directory controller causes the processor to perform operations comprising:

accessing a source file storage directory and a target file storage directory where each identifies a hierarchical structure of folder names, subfolder names, and file names, the file names identifying addressable locations on at least one file storage device where files are stored;

displaying, on a display device, representations of the hierarchical structures identified b, the source file storage directory and the target file storage directory, wherein displaying the representations comprises, for each of the source file storage directory and the target file storage directory, displaying a listing of at least some of the folder names, the subfolder names, and the file names, wherein the listing displayed for the source file storage directory is controlled to be spaced apart on the display device from the listing displayed for the target file storage directory;

identifying inconsistencies between the hierarchical structures identified by the source file storage directory and the target file storage directory;

displaying, on the display device, graphical interconnections extending at least partially between locations of at least some of the inconsistencies identified in the displayed representations of the hierarchical structures identified by the source file storage directory and the target file storage directory, wherein displaying the graphical interconnections comprises, for each of at least some of the graphical interconnections, displaying a graphical line to extend at least partially between a location in each of the listings that corresponds to where one of the file names in the hierarchical structure of the source file storage directory has been moved to and/or renamed as one of the file names in the hierarchical structure of the target file storage directory;

displaying, on the display device, refactoring action indicia that are user selectable, wherein, responsive to selection of the refactoring action indicia, defined actions are queued to be performed by the file directory controller to modify the hierarchical structure identified by the target file storage directory to resolve at least some of the inconsistencies identified between the hierarchical structures identified by the source file storage directory and the target file storage directory, wherein one of the refactoring action indicia comprises a file rename action indicia associated with an action that renames a file name, and wherein the file rename action indicia is displayed relative to one of the graphical lines that extends at least partially between a location in each of the listings that corresponds to where an original file name in the hierarchical structure of the source file storage directory has been renamed as a renamed file name in the hierarchical structure of the target file storage directory; and merging the source file storage directory and the target file storage directory including by performing the defined actions queued in response to selection of the refactoring action indicia to generate a refactored target file storage directory that has the at least some of the inconsistencies resolved, wherein merging the source file storage directory and the target file storage directory comprises:

responsive to when the file rename action indicia is selected by the user, generating the refactored target file storage directory to include the original file name in the hierarchical structure of the source file storage directory in place of the renamed file name in the hierarchical structure of the target file storage directory; and responsive to when the file rename action indicia is not selected by the user, generating the refactored target file storage directory to include renamed file name in the hierarchical structure of the target file storage directory in place of the original file name in the hierarchical structure of the source file storage directory.

11. The computer program product of claim 10, wherein:
the identifying inconsistencies between the hierarchical structures identified by the source file storage directory and the target file storage directory, comprises accessing a tracked changes directory that identifies changes that have been performed over time as the hierarchical structure identified by the source file storage directory is modified to provide the target file storage directory; and
the tracked changes directory identifies file names in the hierarchical structure of the source file storage directory that have been renamed, deleted, added, and moved during generation of the target file storage directory.

12. The computer program product of claim 10, wherein:
the displaying, on the display device, representations of the hierarchical structures identified by the source file storage directory and the target file storage directory, comprises:
for each of the source file storage directory and the target file storage directory, displaying a listing of at least some of the folder names, the subfolder names, and the file names, wherein the listing displayed for the source file storage directory is controlled to be spaced apart on the display device from the listing displayed for the target file storage directory; and
displaying a group of the file names in the listing for the source file storage directory using a deletion graphical indicia responsive to identifying in the inconsistencies that the group of file names in the listing for the source file storage directory were deleted from the listing for the target file storage directory.

13. The computer program product of claim 12, further comprising:
selectively displaying the deletion graphical indicia responsive to detecting a mouse cursor hovering over one of the refactoring action indicia that is a deletion action indicia associated with a file deletion action for the group of file names.

14. The computer program product of claim 13, wherein the merging the source file storage directory and the target file storage directory comprises:
responsive to when the deletion action indicia is selected by the user, generating the refactored target file storage directory to not include the group of file names from the listing for the source file storage directory that were deleted from the listing for the target file storage directory; and
responsive to when the deletion action indicia is not selected by the user, generating the refactored target file storage directory to include the group of file names from the listing for the source file storage directory that were deleted from the listing for the target file storage directory.

15. The method of claim 6, further comprising:
responsive to detecting a mouse cursor hovering over the file move action indicia, displaying the one of the graphical lines that extends at least partially between the location in each of the listings that corresponds to where the file name in the hierarchical structure of the source file storage directory has been moved to in the hierarchical structure of the target file storage directory.

16. A computer program product, comprising:
a non-transitory computer readable storage medium comprising computer readable program code embodied in the medium that when executed by a processor of a file directory controller causes the processor to perform operations comprising:
accessing a source file storage directory and a target file storage directory where each identifies a hierarchical structure of folder names, subfolder names, and file names, the file names identifying addressable locations on at least one file storage device where files are stored;
displaying, on a display device, representations of the hierarchical structures identified by the source file storage directory and the target file storage directory, wherein displaying the representations comprises, for each of the source file storage directory and the target file storage directory, displaying a listing of at least some of the folder names, the subfolder names, and the file names, wherein the listing displayed for the source file storage directory is controlled to be spaced apart on the display device from the listing displayed for the target file storage directory;

identifying inconsistencies between the hierarchical structures identified by the source file storage directory and the target file storage directory;

displaying, on the display device, graphical interconnections extending at least partially between locations of at least some of the inconsistencies identified in the displayed representations of the hierarchical structures identified by the source file storage directory and the target file storage directory, wherein displaying the graphical interconnections comprises, for each of at least some of the graphical interconnections, displaying a graphical line to extend at least partially between a location in each of the listings that corresponds to where one of the file names in the hierarchical structure of the source file storage directory has been moved to and/or renamed as one of the file names in the hierarchical structure of the target file storage directory;

displaying, on the display device, refactoring action indicia that are user selectable, wherein, responsive to selection of the refactoring action indicia, defined actions are queued to be performed by the file directory controller to modify the hierarchical structure identified by the target file storage directory to resolve at least some of the inconsistencies identified between the hierarchical structures identified by the source file storage directory and the target file storage directory, wherein one of the refactoring action indicia comprises a file move action indicia associated with an action that moves a location of a file name in the hierarchical structure of the source file storage directory to another location in the hierarchical structure of the target file storage directory, and wherein the file move action indicia is displayed relative to one of the graphical lines that extends at least partially between a location in each of the listings that corresponds to where a file name in the hierarchical structure of the source file storage directory has been moved to in the hierarchical structure of the target file storage directory; and merging the source file storage directory and the target file storage directory including by performing the defined actions queued in response to selection of the refactoring action indicia to generate a refactored target file storage directory that has the at least some of the inconsistencies resolved, wherein merging the source file storage directory and the target file storage directory comprises:

responsive to when the file move action indicia is selected by the user, generating the refactored target file storage directory to include the file name at a location corresponding to the location of the file name in the hierarchical structure of the source file storage directory; and responsive to when the file move action indicia is not selected by the user, generating the refactored target file storage directory to include the file name at a location corresponding to the location of the file name in the hierarchical structure of the target file storage directory.

* * * * *